United States Patent Office 3,502,772
Patented Mar. 24, 1970

3,502,772
METHOD FOR STIMULATING ANOVULATORY CYCLES AND PHARMACEUTICAL PACKAGES
Gerrit Lourens Ijzerman, Herpen, Netherlands, assignor to Organon Inc., West Orange, N.J., a corporation of New Jersey
No Drawing. Filed Oct. 16, 1967, Ser. No. 675,309
Claims priority, application Netherlands, Nov. 2, 1966, 6615481
Int. Cl. A61j 7/00; A61k 17/00
U.S. Cl. 424—239          3 Claims

ABSTRACT OF THE DISCLOSURE

The present invention relates to a novel method for stimulating anovulatory cycles comprising administering in two successive phases during the first phase covering 6 to 13 days an oestrogenic compound and during the second phase covering 14–16 days a combination of an oestrogenic and a progestational compound.

---

The invention relates to a method for stimulating anovulatory cycles by administering oestrogenic and progestative substances during a certain period of the cycles, and to packages containing the required number of pharmaceutical dosage units destined for use in the method of treatment according to the invention.

The administration of oestrogenic and progestative substances during a certain period of the menstrual cycle to prevent ovulation has greatly increased, especially in the last few years.

A method of treatment particularly applied for this purpose consists in that usually during 20 to 22 successive days a combination of oestrogenic and progestative substances is administered daily, starting a few days after the beginning of the last menstrual period, usually on the 5th day (so-called Combined Treatment).

Another method developed at a later date, the so-called Sequential Treatment, consists in that the combination of oestrogenic and progestative substances is not administered during the whole period of treatment, but from the 2nd–5th day after the beginning of the menstrual period till the 20th day an oestrogenic compound only per day, and then from the 20th up to and including the 25th day, a combination of oestrogenic and progestative compounds per day.

A variant of this method is the so-called Serial Treatment, in which the administration of biologically active compounds is alternated with inactive compounds only serving to maintain the regularity in the administration.

The sequential and serial methods of treatment described above have the great disadvantage that they are not reliable, because ovulation is not suppressed in all cases. According to publications pregnancy occurs in about one out of 1000 treated cycles.

The combined treatment on the other hand has proved to be fully reliable, but owing to the fact that during the whole period of treatment a progestative substance is administered so that the hormonal pattern deviates from that occurring during natural, non-treated cycles, during which progesterone is not secreted until after ovulation and development of the follicle into the corpus luteum, the growth and development of the mucous membrane deviate, too.

An entirely new method of treatment has now been found which has proved to be fully reliable, and which simulates as accurately as possible the hormonal ratios during the normal ovulatory physiological cycles of the subject, so that, for example, the build-up of the uterine membrane and the changes in the cervical membrane also follow the physiological pattern, which is not the case in the methods that have been adopted so far.

The method according to the invention consists in that the treatment with oestrogenic and progestative compounds covers a period of from 20 to 27 days of the cycle, and comprises two successive phases. During the first phase an oestrogenic compound is administered daily, and during the phase following directly after it a combination of oestrogenic and progestative compounds daily, the second phase covering at least 14 and at most 16 days.

Preferably administration takes place for 22 days, beginning not later than the 5th day after the onset of the last menstruation, the first or oestrogenic phase lasting 7 days, and the second or combined oestrogenic and progestative phase 15 days.

The present method is called the Normophasic method.

In principle use can be made of oestrogenic substances differing greatly in structure if they satisfy the requirement that they do not only have an oestrogenic but also an ovulation inhibiting activity. It is preferred to employ 17α-alkyl derivatives of oestradiol and functional derivatives of these compounds, such as 17α-ethynyl-oestradiol, 17α-methyl-oestradiol and the 3-alkyl-ethers thereof, oestrone or esters of oestradiol, 16α-chloro-oestrone, 16α-iodo-oestrone and 3-alkyl-ethers thereof or equilin.

The progestative compounds to be used in the second phase may also differ greatly structurally. Generally these compounds belong to the steroids of the 19-nor (oestrane) series, androstane or to the pregnane series, such as $\Delta^{5(10)}$-3-keto-17β-hydroxy-17α-ethynyl-oestrene,
  17α-ethynyl-19-nor-testosterone and 17-esters thereof,
$\Delta^{5(10)}$-3,17-diacetoxy-17α-ethynyl-oestrene, 6α-methyl-
  17α-(1-propynyl)-testosterone, 6α-methyl-17α-acetoxy-
  progesterone,
$\Delta^6$-6-methyl-17α-acetoxy-progesterone,
$\Delta^6$-6-methyl-16-methylene-17α-acetoxy-progesterone, and
$\Delta^6$-6-chloro-17α-acetoxy-progesterone.

Preferred compounds are the $\Delta^4$-17β-hydroxy-17α-ethynyl-oestrene and the $\Delta^{5(6)}$- and $\Delta^{5(10)}$-isomers of this compound.

The dosaging of the oestrogenic compound in the first phase, and of the oestrogenic and progestative compounds in the second phase may vary within certain limits, depending, i.e. on the activity of the compounds used, but of the oestrogenic compound a daily dose of from 50 to 1 gammas is usually administered in the first phase, which quantity is also given daily in the second phase together with a daily dose of from 0.5 to 5 mg. of the progestative compound.

Although administration may take place in various ways, oral administration is the commonest. For this purpose the relative active compounds are made into certain pharmaceutical dosage units, such as tablets, pills, capsules, or coated tablets, after mixing with the conventional auxiliaries.

The number of pharmaceutical dosage units required for one period of treatment, viz a total of from 20 to 27 units, of which 6 to 13 units for the first phase, and 14 to 16 units for the second phase, are usually put up in one pack. The tablets or other dosage units for the first and second phase may be made of contrasting colours.

Preferably the relative packages are provided with day-of-week indication, showing when the units corresponding with these indications are to be taken during the cycle.

The units may be packed in tubes or boxes, on charts and the like.

If boxes are used, which may have a round, rectangular or another form, each pharmaceutical unit is loaded in its own individual holder, usually along the circumference of the box bearing an adjustable or non-adjustable series of day-of-week indications showing when the tablets are to be taken.

Another suitable form of packing consists in that the units are packed on a chart of a suitable material, preferably a press pack, bearing the day-of-week indications.

Hence the invention also relates to packages of pharmaceutical dosage units for the stimulation of anovulatory cycles, consisting in that these packs contain 6 to 13 units containing as hormonal compound an oestrogenic compound only, and 14 to 16 units containing a combination of oestrogenic and progestative compounds.

In the following examples the composition is given of a few series of pharmaceutical dosage units each destined for one period of treatment.

EXAMPLE I

1st phase

Seven tablets containing the following components per tablet:

17α-ethynyl-oestradiol—80 gammas.
Potato starch—20 mg.
Glycerol (100%)—1.8 mg.
Magnesium stearate—1 mg.
Talc—4 mg.
Lactose to 100 mg.

2nd phase

Fifteen tablets containing the following components per tablet:

17α-ethynyl-oestradiol—80 gammas.
$\Delta^{5(6)}$-17β-hydroxy-17α-ethynyl-oestrene—2.5 mg.
Potato starch—18.5 mg.
Stearic acid—1 mg.
Talc—4 mg.
α-Tocopherol—0.2 mg.
Sunset yellow FCF—0.025 mg.
Lactose to 100 mg.

EXAMPLE II

1st phase

Seven tablets containing the following components per tablet:

17α-ethynyl-oestradiol-3-methyl-ether—75 gammas.
Gelatin—3 mg.
Talc—8 mg.
Magnesium stearate—3.5 mg.
Lactose to 200 mg.

2nd phase

Fifteen tablets containing the following components per tablet:

$\Delta^4$-17β-hydroxy-17α-ethynyl-oestrene—2.5 mg.
17α-ethynyl-oestradiol-3-methyl-ether—75 gammas.
Potato starch—18.5 mg.
Glycerol (100)%—1.85 mg.
Magnesium stearate—1 mg.
Talc—4 mg.
α-Tocopherol—0.2 mg.
Sunset yellow FCF—0.025 mg.
Lactose to 100 mg.

EXAMPLE III

Tablets were made for the 1st and the 2nd phase of the same composition as in Examples I and II, using as active oestrogenic component for the 1st and the 2nd phase 17α-ethynyl-oestradiol, or the 3-methyl-ether thereof, and as progestative component for the 2nd phase $\Delta^{5(10)}$-17β-hydroxy-17α-ethynyl-oestrene (2.5 mg. per tablet), 17α-methyl-19-nor-testosterone (5 mg. per tablet), or $\Delta^{5(10)}$-3-keto-17β-hydroxy - 17α - ethynyl-oestrene (5 mg. per tablet).

What is claimed is:
1. In a method for stimulating anovulatory cycles in women by administering oral dosages of oestrogenic and progestational substances during a certain period of 22 days in consecutive sequence in the menstrual cycle, the improvement in that the physiological hormonal pattern does not deviate from that occurring during natural non-treated cycles, during which progesterone is not secreted until after ovulation and development of the follicle into the corpus luteum which consists essentially of suppressing ovulation by administering orally, once daily, from no later than the 5th day following the first day of menstruation and during the next 6 days thereafter, a total of 7 days an oestrogenic substance having an ovulation inhibiting activity in a quantity of from 50 to 150 gammas daily, and subsequently during the next 15 days a combination of an oestrogenic substance having an ovulation inhibiting activity and a progestative substance the first of which is in a quantity of from 50 to 150 gammas and the second of which is in a quantity of from 0.5 to 5 mg. daily and thereby to simulate as accurately as possible the hormonal ratios durng the normal ovulatory physiological cycles in women, so that the build up of the uterine membrane and the changes in the cervical membrane also follow the physiological hormone pattern.

2. Method according to claim 1, in which the oestrogenic substance is selected from the group consisting of oestrone, oestradiol, 17α-saturated and unsaturated alkyl-oestradiol, 16a-halo-oestrone, and the esters and 3-alkyl ethers thereof, and the progestative substance is selected from the group consisting of a steroid of the oestrone, androstane, and pregnane series.

3. Method according to claim 1, in which the oestrogenic substance is 17α-ethynyl-oestradiol, and the progestative substance is $\Delta^{5,6}$-17β-hydroxy-17α-ethynyl-oestrene.

References Cited

UNITED STATES PATENTS

| | | | |
|---|---|---|---|
| 3,143,207 | 8/1964 | Wagner | 206—42 |
| 3,278,010 | 10/1966 | Katz | 206—42 |
| 3,283,885 | 11/1966 | Grunewald et al. | 206—42 |
| 3,324,995 | 6/1967 | Sharp | 206—42 |
| 3,409,721 | 11/1968 | Applezweig | 424—239 |

OTHER REFERENCES

C&EN: March 27, 1967 pp. 44–49 "Biochemistry of the Pill Largely Unknown."

S. R. ROSE, Primary Examiner

U.S. Cl. X.R.

116—121; 206——42; 221—2; 424—2, 6, 7

PO-1050
(5/69)

UNITED STATES PATENT OFFICE
CERTIFICATE OF CORRECTION

Patent No. 3,502,772        Dated March 24, 1970

Inventor(s) GERRIT LOURENS IJZERMAN

It is certified that error appears in the above-identified patent and that said Letters Patent are hereby corrected as shown below:

Claim 1, column 4, line 26, change "15" to ---14 to 16---.

SIGNED AND
SEALED
DEC 8 1970

(SEAL)
Attest:

Edward M. Fletcher, Jr.
Attesting Officer

WILLIAM E. SCHUYLER, JR.
Commissioner of Patents